W. P. HARPER.
DEVICE FOR MARKING EARS OF ANIMALS.
APPLICATION FILED MAY 7, 1915.
1,206,323.
Patented Nov. 28, 1916.
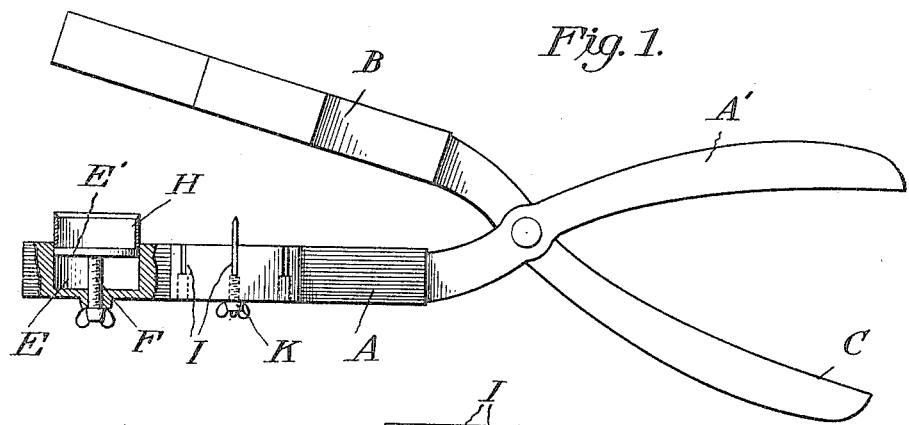
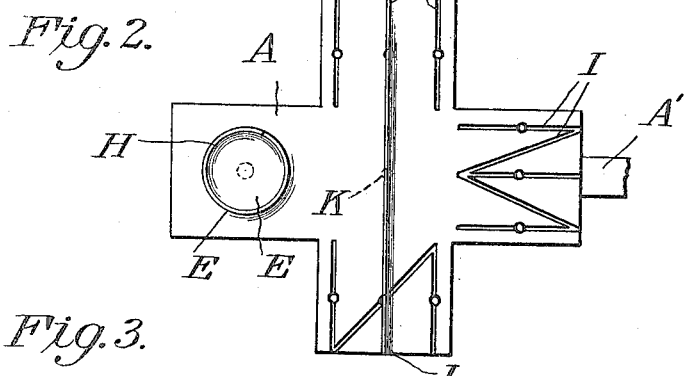
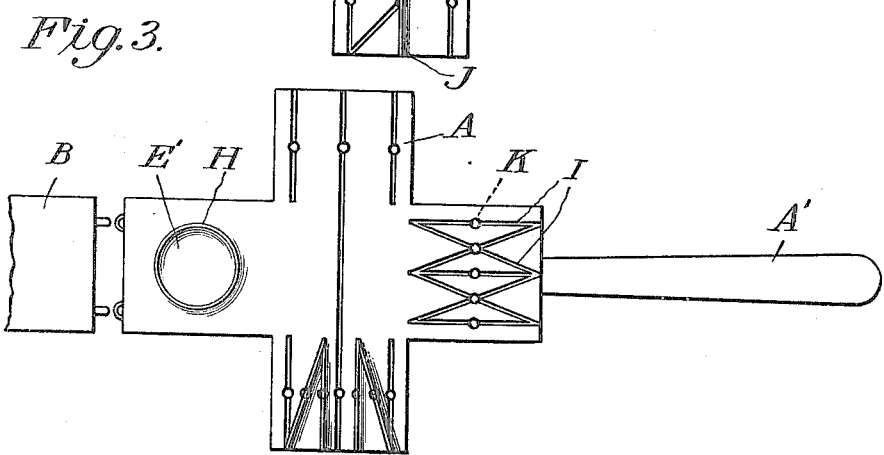
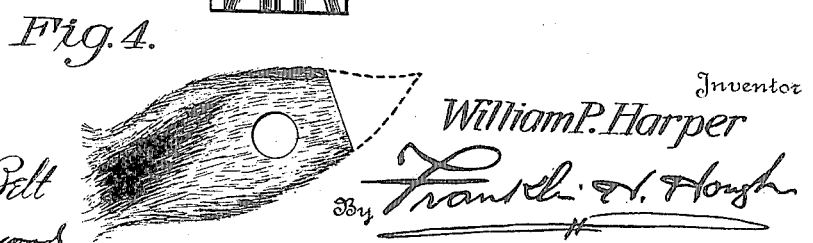
Witnesses
Inventor
William P. Harper

UNITED STATES PATENT OFFICE.

WILLIAM P. HARPER, OF ABILENE, KANSAS.

DEVICE FOR MARKING EARS OF ANIMALS.

1,206,323.

Specification of Letters Patent. Patented Nov. 28, 1916.

Application filed May 7, 1915. Serial No. 26,544.

*To all whom it may concern:*

Be it known that I, WILLIAM P. HARPER, a citizen of the United States, residing at Abilene, in the county of Dickinson and State of Kansas, have invented certain new and useful Improvements in Devices for Marking Ears of Animals; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in devices for marking ears of animals and consists of a simple and efficient device of this nature so arranged that the different designs of markings may be made to the ears.

The invention comprises a simple and efficient apparatus of this nature having various details of construction, combinations and arrangements of parts which will be hereinafter fully described, shown in the accompanying drawings and then specifically defined in the appended claim.

My invention is illustrated in the accompanying drawings, in which:—

Figure 1 is a side elevation showing two hinged members open. Fig. 2 is a plan view of the die member. Fig. 3 is a detail view showing a modified form of the die. Fig. 4 is a detail view showing the ear of an animal which has been marked by the device.

Reference now being had to the details of the drawings by letter, A designates a die member which may be of any suitable shape, and having a handle A'.

B is a hinged top having a handle C, said top being hinged to the die member and preferably of the same shape. The die member is provided with a circular-outlined recess E in which a disk E' is mounted, having swiveled thereto a screw F passing through a threaded aperture in the frame of the die member. A circular cutting knife H is mounted within said recess and is adjusted by means of the disk against which it rests in order to throw the same out beyond the face of the die member and, when not in use, may be moved back into the recess so that the cutting edge will be flush with the face or drawn into the recess entirely. The said die member is provided with grooves, designated by letter I, of different shapes and in which cutting blades J are adapted to be held by means of screws K, fitted in a threaded aperture in the die, said knives being arranged to cut different shaped designs accordingly as may be desired for marking ears of animals different ways.

By the provision of a marking device embodying the features of my invention, it will be noted that a simple and efficient means is afforded whereby the cutting knives may be arranged in the different grooves in order to cut different designs in the ears as may be desired to have a distinctive mark to the ear of the animal. In operation, the ear is placed between the die block and top plate and, by pressing the two handles together, the particular outline desired to be cut in the ear may be made about the edge or through the body portion of the ear.

What I claim to be new is:—

A device for marking ears of animals consisting of a die plate with grooves formed in one face thereof, each groove having an aperture extending through the jaw from the bottom of said recess, blades seated in said recesses and engaging the bottom walls thereof and each blade provided with an integral threaded screw portion extending through the aperture, winged nuts upon the threaded ends of the screw portions, said jaw having a projecting portion which is provided with a recess, a cutting die mounted therein and having a threaded shank portion mounted in a threaded aperture leading into the wall of the recess in which the die is positioned, and a cover hinged to the projecting part of said jaw.

In testimony whereof I hereunto affix my signature in presence of two witnesses.

WILLIAM P. HARPER.

Witnesses:
HARRY C. LITTS,
ROBT. M. GREEN.